United States Patent [19]

Takase et al.

[11] 3,716,924
[45] Feb. 20, 1973

[54] METHOD OF DRYING SYNTHETIC RUBBER MATERIAL

[75] Inventors: Katsuyasu Takase, Yuzo Nakane, Masamichi Yomura, all of Tokyo, Japan

[73] Assignee: The Japanese Geon Co., Ltd. and The Futaba Netsukagaku Kenkyujo Ltd., both of Tokyo, Japan

[22] Filed: March 12, 1971

[21] Appl. No.: 123,719

[52] U.S. Cl. .................................................. 34/36
[51] Int. Cl. ............................................... F26b 3/00
[58] Field of Search ............ 34/14, 17, 36, 37, 70, 15

[56] References Cited

UNITED STATES PATENTS

| | | | |
|---|---|---|---|
| 3,323,222 | 6/1967 | Skidmore et al. | 34/17 |
| 2,391,441 | 12/1945 | Baer | 34/37 |
| 3,262,215 | 7/1966 | Davis et al. | 34/14 |
| 2,567,940 | 9/1951 | Karrer et al. | 34/36 |

*Primary Examiner*—Carroll B. Dority, Jr.
*Attorney*—Sherman and Shalloway

[57] ABSTRACT

A method of drying synthetic rubber materials, which comprises contacting a moisture-containing synthetic rubber material with superheated steam at a temperature which is higher than the condensing temperature of steam, such condensing temperature being higher than 100°C., and up to 500°C.

4 Claims, 1 Drawing Figure

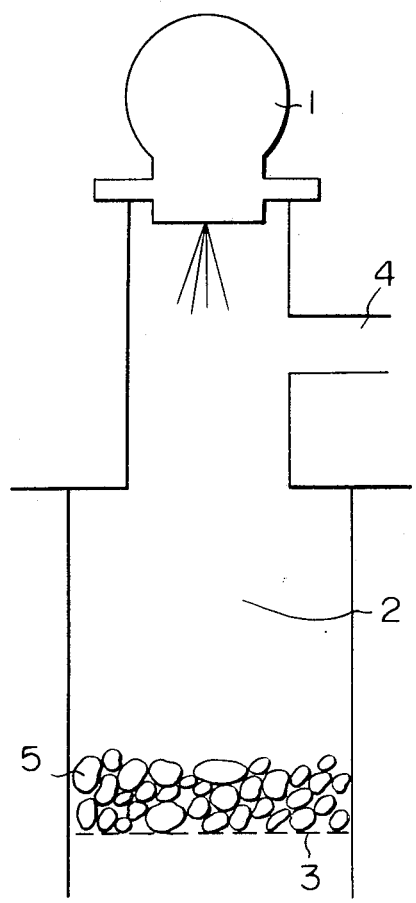

METHOD OF DRYING SYNTHETIC RUBBER MATERIAL

This invention relate to a method of drying a moisture-containing synthetic rubber material within short periods of time.

Drying of synthetic rubbers has been previously preformed by a batch or continuous through circulation drying apparatus, a screw extrusion (rotary) drying apparatus, an expansion drying apparatus, a drum drying apparatus, a vacuum drying apparatus or combinations of these.

The continuous through circulation drying apparatus is adapted to dry a moisture-containing rubber material by passing heated air through the bed of moistened materials. Generally, the moistened materials are loaded in a thickness of 30 to 150 mm on a single endless horizontal conveyor consisting of wire-mesh screen or perforated apron and heated air is forcedly passed through the material bed from above or below. The drying time of about 40 to 120 minutes is required. For a large throughput of material, two or more high conveyors may be employed.

The flash (pneumatic conveyor) drying apparatus brings a turbulent current of drying air into direct contact with wet materials to evaporate the moisture. In this apparatus, air acts as a heat source, and serves to carry away the evaporated moisture and to transport the materials while performing the evaporation and drying. In this flash drying, the residence time of the materials in the apparatus, i.e. drying time, is as short as 1 to 10 seconds.

According to the expansion drying apparatus, rubber materials having a water content of about 50 percent are squeezed to a water content of about 5 to 15 percent by a screw-type extrusion squeezer. The rubber materials are then put into an expansion treating machine (expander), and usually heated to 110° to 230°C. at a pressure of 30 to 100 kg/cm². By a sudden release of the pressure, the materials are extruded through a narrow nozzle (the so-called expansion treatment). When the pressure is reduced, a greater part of the water contained in rubber is explosively evaporated, and the rubber materials become small spongy pieces having porous cells, which are then cooled to about 100°C. or below by the evaporated water. Rubber particles released from the nozzle are put into a hot box (i.e., a chamber disposed at the rear of the nozzle plate and above the vibratory conveyor and maintained at a temperature above the condensing temperature by introduction of heated air), and then drop on the conveyor. The moisture remaining in the rubber particles is substantially completely evaporated while they are carried away on the conveyor and another conveyor connected to it. By this procedure, the rubber materials are dried to a water content of less than 0.5 percent which is a standard for ordinary synthetic rubbers.

In the conventional methods based on the utilization of the drying apparatus described above, rubber frequently sticks to the surface of the conveyor or the wall surfaces of the drying machine and sets to a solid mass of deposit within a short period of time. Since it must be removed frequently by hand, it becomes extremely difficult to operate the apparatus continuously.

The ease with which the rubber material sticks to the surface of the conveyor or the wall surfaces of the drying machine differs according to the inherent properties, shape, temperature and drying time of the rubber materials. However, the contamination of the inside of the drying apparatus, when it processes the same materials, is due most frequently to the fact that rubber which has been in long contact with the drying surface or wall surfaces deteriorates and becomes sticky. It is therefore desired to realize the drying of rubber materials within a short period of time, and to prevent the contamination of the inside of the drying apparatus by avoiding the deterioration of the rubber materials which are in contact with the drying surfaces and wall surfaces of the dryer.

A primary object of the present invention is to provide a method of drying synthetic rubber materials which effects the drying of rubber materials to low water contents within a very short period of time, and enhances the economy of the equipment.

A second object of the invention is to provide a method of drying synthetic rubber materials in which the drying apparatus is rendered operable in a continuous manner by preventing the deterioration of the deposit on the inner wall surfaces of the dryer and also the increase of the deposit.

It has been found that these objects of the invention can be achieved by a method comprising contacting a moisture-containing synthetic rubber material with superheated steam at a temperature which is higher than the condensing temperature of steam, such condensing temperature being higher than 100°C. and up to 500°C. preferably up to 200°C. The method of the invention can be applied to the conventional drying apparatus such as the through circulation drying apparatus, expansion drying apparatus, or flash drying apparatus in which heated air is used as a heat transfer medium.

The accompanying drawing is a schematic illustrating the application of the drying method of the invention to an expansion drying apparatus.

Referring to the drawing, a moisture-containing synthetic rubber material to be dried is charged into an expander 1, and heated at a prescribed temperature and at a prescribed pressure. When the pressure is abruptly released, the rubber material is explosively discharged from the expander 1, and is accumulated on a wire-mesh screen 3 within a chamber 2 as finely cut small particles 5. The particles 5 are dried by superheated steam introduced from an inlet 4. A part of the moisture in the synthetic rubber material is evaporated at the time of the explosive discharge.

In the conventional hot air drying of synthetic rubber materials, it is customary to employ a drying temperature in the vicinity of 80°C. At higher temperatures, for example 100°C., considerably longer periods of time are needed to dry the material to 0.5 percent or less for instance, and especially when the drying temperature is raised to 130°C., it is impossible to dry the material to a water content of less then 0.5 percent. However, when the moisture-containing synthetic rubber material is contacted with superheated steam at a temperature higher than the condensing temperature of steam such condensing temperature being high than 100°C. in accordance with the method of the present invention, the material can be dried to a water content of 0.5 percent or less even at a temperature as high as 130°C. within a very short time. The time required is shorter than the conventional hot air drying method operated at about 80°C., which has conventionally been regarded as optimum.

This fact is demonstrated by the experimental results in the examples given later on, but is a new finding which cannot be expected from general common knowledge that rubber materials tend to deteriorate in air at high temperatures. As will be clear from the comparison of the results in Experiments 2 and 3 given in Table 1, rubber materials containing large quantities of moisture can be dried in accordance with the method of the present invention within a time about one-sixth or less of the drying time that is required of the conventional drying methods under optimum conditions. Furthermore, it will be seen from the results of Experiment 7 given in Table 2 that by the conventional heated air drying, it is impossible to dry a synthetic rubber material to a water content of 0.5 percent or less at a temperature of 130°C.

According to the invention, the rubber material is contacted with superheated steam at a temperature higher than the condensing temperature of steam which is in excess of 100°C., and up to 500°C., preferably up to 200°C., to thereby dry the material to a water content of 0.5 percent or less within short periods of time. The contact time varies depending upon such factors as the kind and bulk of rubber, or the temperature of superheated steam, but a time up to 30 minutes at the longest is sufficient for the purpose of the present invention. If the inside of the drying apparatus is maintained at reduced pressure, it is not impossible to perform the drying of the material at a temperature lower than 100°C. but higher than the dew point of steam. The employment of temperature higher than the condensing temperature of steam which is in excess of 100°C. is needed in order that the drying may be carried out efficiently within short periods of time while minimizing the deposition of rubber onto the inner wall surface of the dryer and preventing the deterioration of the deposited rubber. The use of temperatures in excess of 200°C., especially in excess of 500°C. or unnecessarily long contact with superheated steam is not desirable since it may result in the volatilization of an antioxidant contained in the rubber material and adversely affects the properties of the rubber material. The economy of the method is also reduced. The temperature range specified in the present invention is not employed in the conventional method of removing the moisture of synthetic rubbers by heated air.

According to the invention, drying can be performed within a short period of time by using superheated steam at elevated temperatures, and the continuous operation of the method has been made possible by preventing the deposition of rubber. Since the method does not utilize hot air, the deterioration of the rubber material can be prevented, and it is possible to avoid dangers such as combustion. The method is very useful commercially.

The method of the present invention enables a synthetic rubber material to be dried to a low water content at elevated temperatures within short periods of time, and therefore, is particularly suitable for the drying of rubber which has a character of deteriorating by heat in air and becoming very sticky. Examples of the rubber materials that can be dried by the method of the invention include styrene-butadiene rubber, acrylonitrile-butadiene rubber, polybutadiene rubber, polyisoprene rubber, ethylene-propylene-diene rubber, chloroprene rubber, and butyl rubber etc. The advantages of the present invention show themselves remarkably when drying polybutadiene rubber which has a particularly large tendency to sticking, and polyisoprene rubber which is particularly susceptible to heat deterioration. The synthetic rubber materials to be dried may be in various forms such as fine granules, crumbs, or pellets.

The following Examples will specifically illustrate the invention.

EXAMPLE 1

About 2 g of each of the rubber specimens indicated in Table 1 were put into the expander 1 shown in the drawing, and heated at various temperatures and pressures indicated in Table 1. The pressure was abruptly released, and the specimen was explosively discharged into superheated steam (example of the present invention) or heated air (control example) each maintained at the temperatures indicated in Table 1. The specimen was placed on wire-mesh screen 3 within chamber 2 as fine particles 5, and dried by superheated steam or heated air introduced from an inlet 4 at the rate of 0.5. m/sec. The relation of the drying time to the water content (heat loss) of the specimens is shown in Table 1.

TABLE 1

| Experiments numbers | Present invention Superheated steam | | Controls heated air | | |
|---|---|---|---|---|---|
| | 1 | 2 | 3 | 4 | 5 |
| Rubber specimens | [1] BR 1441 | [1] BR 1441 | [1] BR 1441 | [2] BR 1220 | [2] BR 1220 |
| Water content of specimens (percent dry basis) | 9.2 | 9.2 | 9.2 | 14.5 | 10.0 |
| Expander: | | | | | |
| Temperature (° C.) | 110 | 135 | 140 | 140 | 170 |
| Pressure (kg./cm.²) | 250 | 250 | 250 | 250 | 500 |
| Drying temperature (° C.) | 130 | 130 | 80 | 80 | 100 |
| Drying time (minutes): | Water content (heat loss) percent | | | | |
| 0 | 8 | 5.6 | 2.4 | 4.25 | 3.08 |
| 0.5 | 1.4 | 0.4 | | | |
| 1 | 0.8 | 0.2 | 1.6 | | |
| 2 | 0.6 | [3] | 0.8 | 0.7 | |
| 4 | [3] | | 0.4 | 0.25 | |
| 6 | | | 0.25 | [3] | |
| 10 | | | [3] | | 0.82 |
| 20 | | | | | 0.43 |
| 30 | | | | | 0.23 |

[1] Nipol BR 1441 (aromatic oil-extended polybutadiene rubber, The Japanese Geon Co., Ltd.).
[2] Nipol BR 1220 (polybutadiene rubber, The Japenses Geon Co., Ltd.).
[3] Trace.

The results shown in Table 1 demonstrate that the synthetic rubber was dried to a low content within a very short time of Experiments 1 and 2 (present invention) as compared with Experiment 3 (control example) in which severe expander conditions (higher temperature) and the drying temperature (80°C.) which has conventionally been regarded as optimum were employed. Furthermore, when Experiment 5 is compared with Experiment 4, it will be seen that in the conventional methods, the drying was more difficult at a drying temperature of 100°C. than at 80°C.

EXAMPLE 2

Bulky crumb-like fragments of wet polyisoprene rubber having a moisture content of about 38 percent were charged into an extrusion drying provided with a 1.6 mm diameter die, and extruded while maintaining the temperature of the material at 130°C. to form pellets of the rubber having a water content of 6.0 percent. The pellets were placed on wire-mesh screen 3 of the apparatus shown in the accompanying drawing, and dried by introducing superheated steam (example of the present invention) or heated air (control example) from inlet 4.

The relation among the drying temperature (the temperature inside the chamber 2 in the drawing), the drying time and the water content of the specimens is shown in Table 2.

It is seen from the results shown in Table 2 also that by the method of the present invention, the rubber is dried to a remarkably low water content with a short period of time, and that when heated air is used, it is impossible to dry the rubber at elevated temperatures.

TABLE 2

| Experiment Nos. | Present invention Superheated steam | control Heated air | |
|---|---|---|---|
| | 6 | 7 | 8 |
| Drying temp. (°C.) | 130 | 130 | 100 |
| Drying time (minutes) | Water content (heat loss) (%) | | |
| 0 | 6.0 | 6.0 | 6.0 |
| 5 | 2.64 | — | — |
| 10 | 1.4 | 2.0 | 3.08 |
| 15 | 0.68 | — | — |
| 20 | 0.4 | 1.68 | 1.88 |
| 25 | 0.16 | — | — |
| 30 | trace | 1.48 | 1.24 |
| 40 | | 1.4 | 0.88 |
| 50 | | trace | 0.6 |
| 60 | | | 0.54 |

We claim:

1. A method of drying synthetic rubber materials, which comprises contacting a moisture-containing synthetic rubber material with superheated steam at a temperature higher than the condensing temperature of said stream, said condensing temperature being higher than 100°C., and up to 500°C.

2. A method of drying synthetic rubber materials, which comprises contacting a moisture-containing synthetic rubber material with superheated steam at a temperature which is higher than the condensing temperature of said steam, said condensing temperature being higher than 100°C., and up to 200°C.

3. A method of claim 1, wherein said synthetic rubber material is polybutadiene.

4. A method of claim 1, wherein said synthetic rubber material is polyisoprene.

* * * * *